April 29, 1958  R. J. N. LE BRUSQUE  2,832,604
CLAMPING CHUCK

Filed Feb. 26, 1957  5 Sheets-Sheet 1

April 29, 1958  R. J. N. LE BRUSQUE  2,832,604
CLAMPING CHUCK
Filed Feb. 26, 1957  5 Sheets-Sheet 3
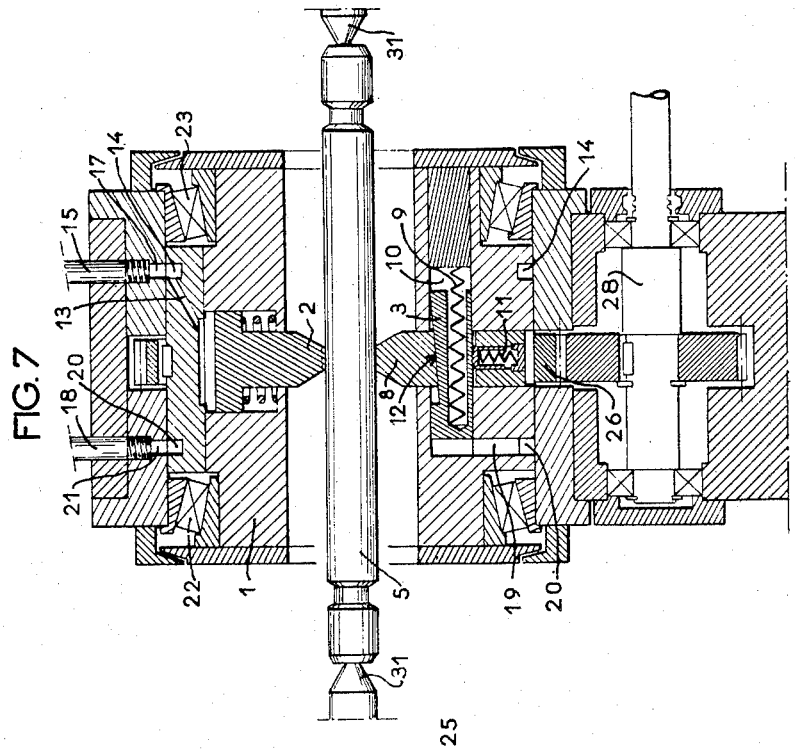
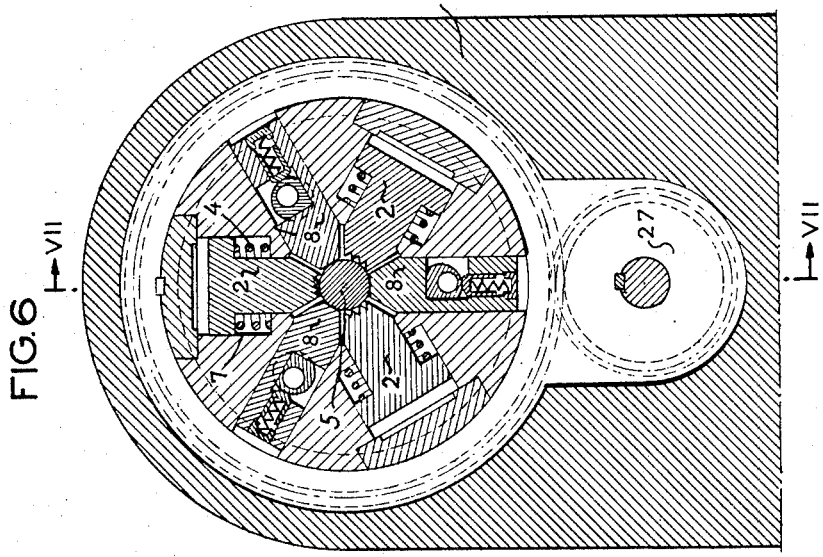

April 29, 1958 — R. J. N. LE BRUSQUE — 2,832,604
CLAMPING CHUCK

Filed Feb. 26, 1957 — 5 Sheets-Sheet 5

United States Patent Office 2,832,604
Patented Apr. 29, 1958

2,832,604

CLAMPING CHUCK

René Jean Nicolas Le Brusque, Malakoff, France, assignor to H. Ernault-Batignolles Societe Anonyme, Paris, France, a French company Application February 26, 1957, Serial No. 642,405

Claims priority, application France February 28, 1956

10 Claims. (Cl. 279—119)

This invention relates to clamping chucks for supporting and driving a piece of work on a machine-tool.

In many machining operations, it is desirable to clamp a work-piece in a chuck at a substantial distance from its extremities so as to permit machining the said extremities. Now, if the piece has a somewhat elongated shape, or if the distance between the chuck and the extremities of the piece is too great, the effort exerted on the piece by the first clamping part of the chuck which comes into contact with the piece may cause objectionable flexure. It has been proposed, for obviating this drawback, to replace conventional clamping chucks by special chucks equipped with balanced jaws in which a floating control (e. g. comprising a spherical swivel-joint transmission) uniformly distributes the clamping forces between the jaws of the chuck. Unfortunately, such a control is subject to disturbing friction, so that, as long as all jaws are not effectively in contact with the piece, the latter is subjected to stresses which are quite often sufficient to cause objectionable flexure.

In other known constructions, the jaws are first brought into contact with the piece under slight pressure, whereafter they are simultaneously clamped around the piece. This arrangement however also proves insufficient, since it is impossible to obtain a uniform action of the jaws during the final clamping phase so that the piece is unavoidably deformed.

An object of the invention is to provide a clamping chuck capable of supporting and driving a piece of work without causing the slightest deformation or the slightest flexure of the piece.

For this purpose, a clamping chuck according to the invention essentially comprises a bearing or abutment system which is brought into contact with the piece prior to the clamping operation with a radial pressure limited to a value sufficiently low to cause neither flexure nor deformation of the piece, said bearing system being capable of holding the piece stationary in all radial directions. Separate clamping means are provided to be applied only when said bearing system has been put into operative position, the radial resultant of the actions of said clamping means being substantially nil.

The invention also proposes to interpose, between each bearing point of the bearing system and the mechanism provided to generate the required slight radial pressure, wedging means capable of binding the piece without being jammed thereby.

Once a piece has been clamped in a chuck according to the invention, it is possible, in certain machining operations, to remove completely the centers which are usually used for mounting the work piece on the machine tool. As a matter of fact, since the piece has undergone practically no deformation, the extremities previously supported by the centers located on the axis of the chuck will then remain on the said axis, the removal of the centers thus causing no modification of the conditions in which the work-piece is rotated.

Any type of clamping means may be used in the chuck, provided they are capable of making the piece rotatively fast with the chuck without exerting thereon any material resultant radial stress. The invention does not exclude insuring rotation of the piece by the chuck other than by clamping means. It is, however, a particular object of the invention to use for that purpose conventional balanced jaws.

Any number of jaws equal to or greater than two, and any number of bearing members equal to or greater than three may be provided in the clamping chuck according to the invention.

However, in a specific construction which has proved excellent in practice, the chuck comprises three bearing members and four balanced clamping jaws.

Another object of the invention is to provide simple control means for actuating the bearing system and the clamping means provided to insure rotation of the piece.

Still a further object of the invention is to provide a simple hydraulic control system therefor.

Illustrative embodiments of the invention will be hereinafter described with reference to the accompanying drawings, given merely by way of example.

In these drawings:

Fig. 6 is a diametrical section of a hydraulically controlled chuck according to the invention.

Fig. 7 is an axial section along line VII—VII of Fig. 6.

Figure 1:
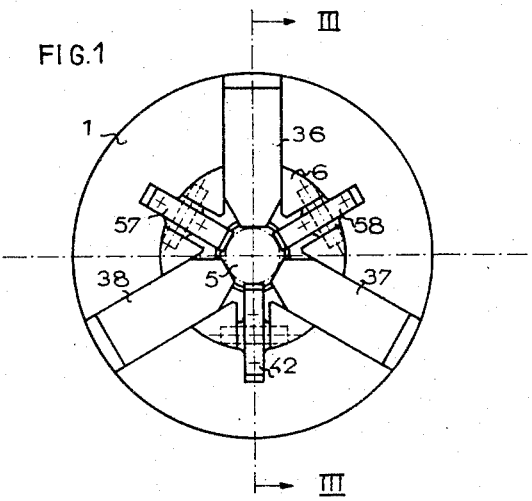
Fig. 1 is an elevational view of a clamping chuck according to the invention, provided with three balanced clamping jaws and an independent three-point abutment or bearing system.
Figure 2:
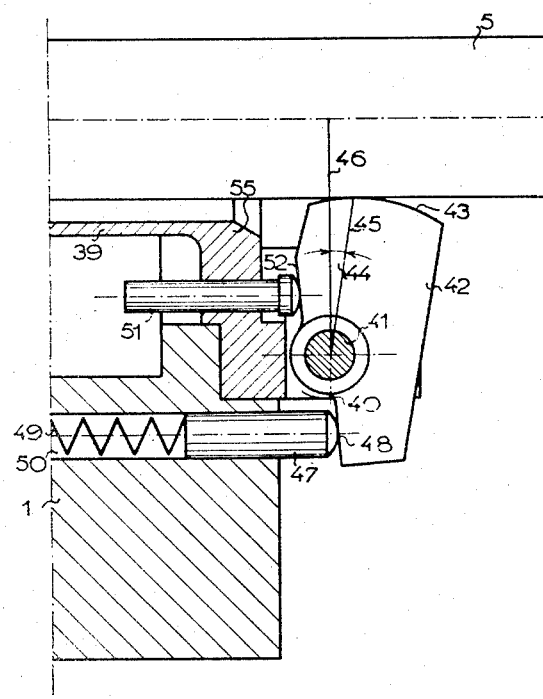
Fig. 2 is a partly enlarged view in diametrical section of one abutment member of the device of Fig. 1.

In the embodiment shown in Figs. 1 to 5, the clamping chuck according to the invention insures by its abutment system an omnidirectional radial locking of the work-piece before the clamping of the jaws.

For this purpose, in the example shown, the chuck is provided with three clutching means or dogs 42, 57 and 58, angularly spaced by an angle of less than 180° such as, for example, 120°. One of these dogs 42 is shown in greater detail in Fig. 2. It is pivoted around an axle 41 on a flange 55 of a sleeve 39 rigid with the chuck body 1 and through which the work-piece 5 is freely accommodated, the axle 41 being orthogonal to the rotation axis of the chuck so that the dog 42 can be tilted in an axial plane. On its edge, intended to offer a bearing abutment to the piece 5, the dog 42 is provided with a slope 43 acting as a wedging cam. It suffices to this effect that, in the position shown in Fig. 2, the angle 44 between a line 46 at right angles to the axis of the piece 5, and located in the axial plane in which the dog 42 is tiltable, on the one hand, and a line 45 passing through the bearing point and extending at right angles to the pivoting axis of the dog, on the other hand, be comprised within suitable limits.

The dog 42 is continuously urged towards its operative position in contact with the work-piece by a spring-loaded stud 47 suitably mounted in a longitudinal bore 50 of the chuck body 1. The spring of said stud is shown at 49. The outer end of the spring-loaded stud 47 bears on a surface 48 of the dog 42. It will be understood that the strength of the spring 49, as affected by the ratio of the lever arms of the dog 42 is the only force pressing the latter against the piece; this force, further decreased by the slope 43, offers an extremely weak radial component. If the above mentioned angle is comprised between appropriate limits, the dog 42, when in contact with the piece 5, locks the same against any outward radial displacement in its plane without, however, being jammed against the piece. The withdrawal of the dog 42 against the action of the spring 49 is insured by a pusher 51 slidable in a longitudinal bore of the flange 55 under the action of suitable control means of which an illustrative example will be described hereunder with reference to the general operation of the chuck.

It will be easily understood that, once the three dogs 42, 57 and 58 have been put into position, the piece 5 is positively held against any radial shifting. In the example shown, the clamping means provided to insure rotational driving of the piece by friction, is constituted by three clamping jaws 36, 37 and 38, angularly spaced by 120° and equidistant from the adjacent dogs 42, 57 and 58; one of these clamping jaws, 36, is shown in detail in Figs. 3 to 5. In these figures, it may be seen that the jaw 36 is slidably mounted for radial adjustment, its guiding being ensured by a lug 59, sliding in a radial slot, and by a radial shoulder 60 in contact with a radial surface 61 of the chuck-body 1. The sliding of the jaw 36 is insured by a bell-crank lever 62 freely pivoted around an axle 63, orthogonal to the axis of the chuck and the active ends of which are provided with rotula heads 64 and 65. The head 64 is engaged in a recess 66 of the associated jaw, while the head 65 is engaged in a housing 67 in a knee joint 53 having a bore engaged with a substantial clearance on the sleeve 39 and mounted in a recess provided with spherical surfaces 68 of a bushing 54 which is slidably mounted on the sleeve 39. The bushing 54 controls the pushers such as 51, of the dogs, while it simultaneously acts on the three jaws 36, 37 and 38 through the knee joint 53 and the bell-crank levers, such as 62 which together form a floating mechanical means. This action constitutes a balancing effect which, once the jaws have been set into position, uniformly distributes the clamping efforts between them.

Figure 3:
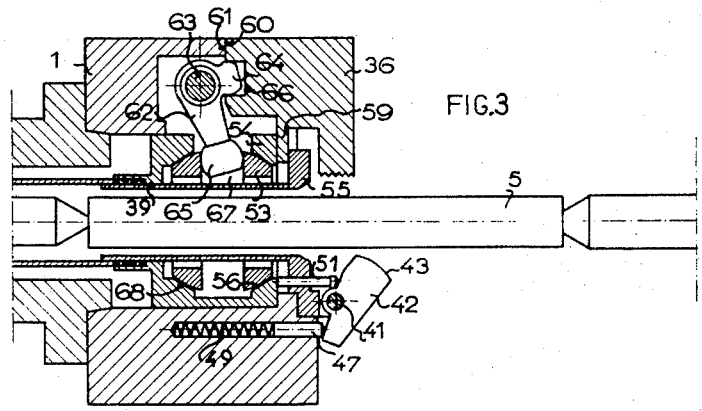
Figs. 3, 4 and 5 are diametrical sectional views along line III—III of Fig. 1 of the chuck shown in Figs. 1 and 2 in three positions, viz: at rest, after the abutment system has been put into position and once the jaws have been clamped.
Figure 4:
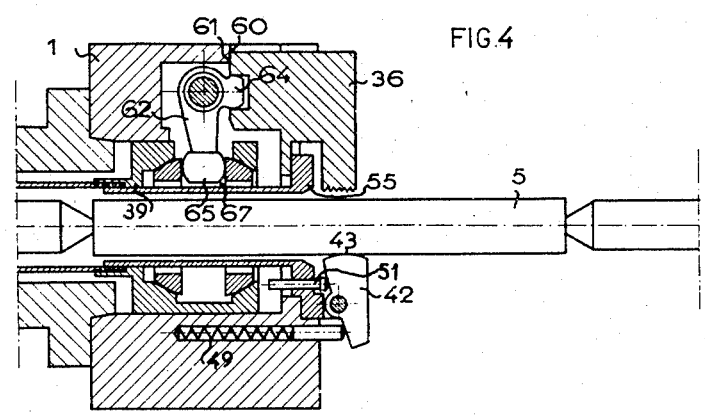
Figure 5:
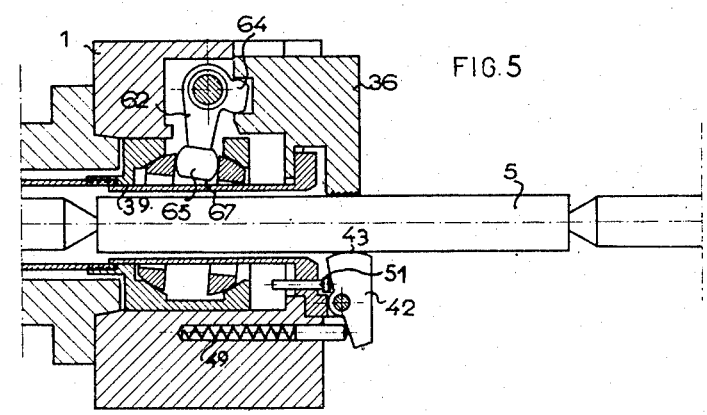

This device operates as follows: in its terminal resting position, shown in Fig. 3, the bushing 54 holds the dogs 42, 57 and 58 as well as the jaws 36, 37 and 38 spaced at a maximum through the pushers, such as 51, and through the knee joint 53 and the bell-crank levers, such as 62 respectively.

Now, if the bushing 54 is displaced by means of a suitable control system (not shown) towards the left, the bushing first releases the pushers of the dogs (see Fig. 4) and the latter are brought into contact with the piece 5 under the action of their springs 49. From this moment, the piece 5 is completely locked radially on the bearing-abutment system constituted by the three dogs. As the displacement of the bushing 54 towards the left continues, the clamping jaws are brought nearer to the piece, one of the jaws such as 36, first coming into contact therewith. Then, due to the freedom of adjustment insured by the knee joint 53, the jaw 36 stops moving while both of the other jaws are further displaced towards the piece, and so on, until the three jaws are brought into contact, whereupon the clamping effort is distributed between them as indicated above.

In the embodiment shown in Figures 6 and 7, the chuck according to the invention comprises three abutment members 8, angularly spaced by 120°, and three clamping jaws 2, also angularly spaced by 120°, and each equidistant from two adjacent abutment members 8. Each clamping jaw 2 constitutes a piston slidably mounted in a cylinder 7 and continuously urged away from the work piece 5 by a spring 4. Each abutment member 8 is associated with a wedge 3 extending at right angles thereto in an axial plane of the chuck and also constituting a piston slidably mounted in a cylinder 10 and continuously urged by a spring 9 in the direction tending to press the associated abutment member 8 against the work piece 5. A spring-loaded stud 11, slidably mounted in each abutment member 8, yieldingly presses the associated wedge 3 into contact with a sloping surface 12 of said abutment member cooperating with the sloping face of said wedge. The three cylinders 7 communicate through oblique ports 13 with an annular groove 14 continuously communicating through a fixed radial port 17 with a pipe 15. Similarly, the three cylinders 10 communicate through radial bores 19 with an annular groove 20, continuously communicating through a fixed radial port 21 with a pipe 18. The body 1 of the chuck is journalled, in the example shown, through two roller bearings 22 and 23 on a fixed support 25 rigid with the machine tool (not shown). The rotation of the chuck 1 is insured, in the example shown, by a toothed annulus 26, rigid with said chuck and meshing with a pinion 27 keyed on a shaft 28 driven by any suitable motor means (not shown).

Figure 9:
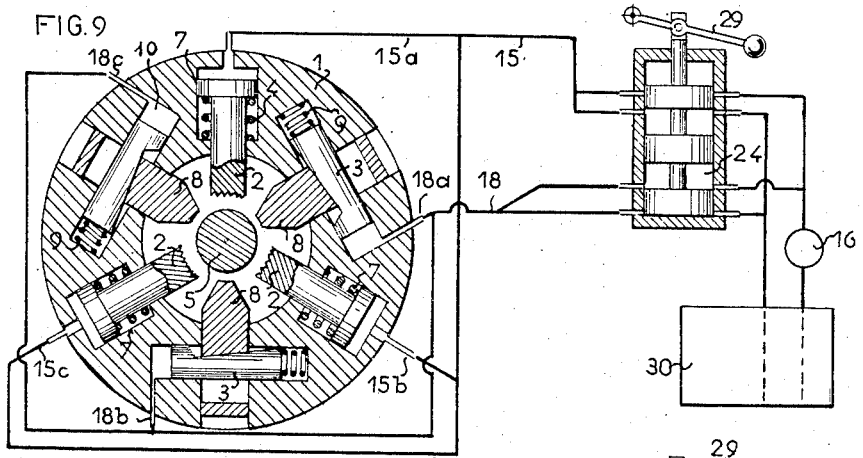
Figs. 9 to 11 are diagrammatical views illustrating the three steps of the operation of the chuck shown in Figs. 6 to 8.
Figure 10:
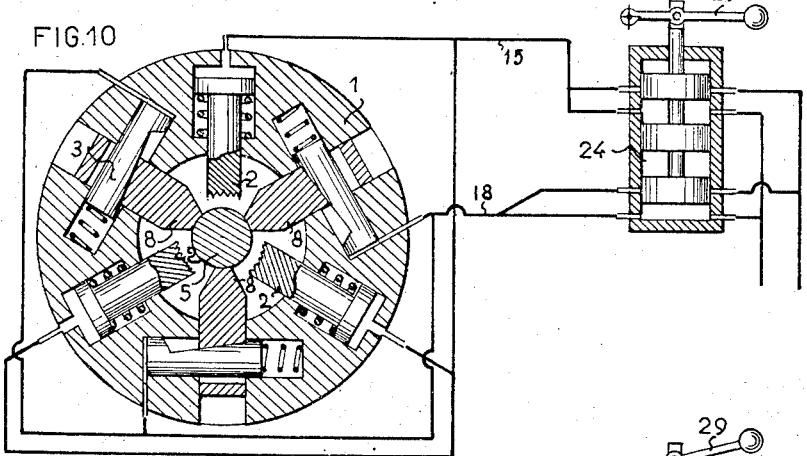
Figure 11:
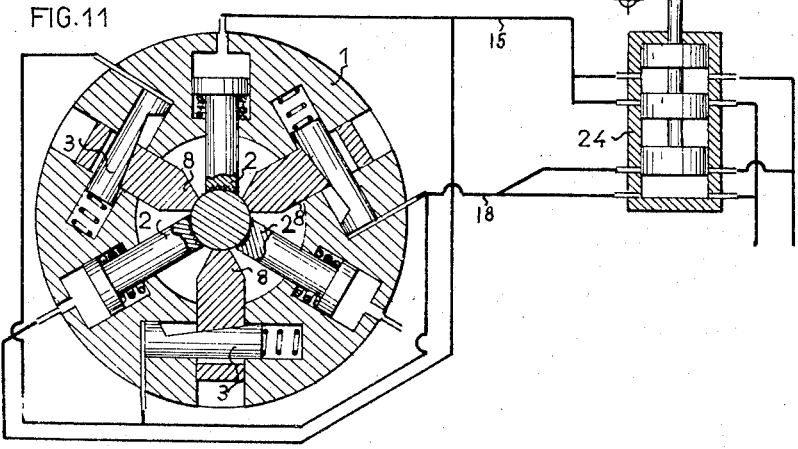

A suitable hydraulic system adapted to control the operation of the chuck shown in Figures 6 and 7 is illustrated in Figures 9 to 11. In this illustration, the hydraulic system essentially comprises a pump 16 capable of selectively feeding the pipes 15 and 18 of the chuck assembly under the control of a sliding valve 24 provided, for example, with a hand control lever 29. The sliding valve also controls exhaust communications between the pipes 15 and 18 and a tank 30.

The operation of this device is as follows:

In the position shown in Figure 9, the sliding valve 24 establishes a communication between the pipe 15 and the tank 30, and another communication between the pump 16 and the pipe 18. Under these conditions, the cylinders 7 communicate with the tank, so that their springs 4 are capable of holding the jaws 2 at a maximum spacing relative to the work piece 5. On the other hand, the cylinders 10 are fed with pressure fluid so that the wedges 3 retract the abutment members 8 against the action of the spring 9. Thus, a work piece, such as 5, may be easily passed through the chuck and mounted between centers as shown at 31 in Figure 7.

The sliding valve is then brought, e. g. by means of the lever 29, from the position of Figure 9 to that of Figure 10. The pipe 15 remains connected with the tank 30 while the pipe 18 is also set into communication with said tank. Simultaneously, the previous communication of said pipe 18 with the pump 16 is interrupted. Under these condition, the pressure fluid previously contained in the cylinders 10 is exhausted to the tank 30 so that the springs 9 are capable of pushing the wedges 3 which in turn press the abutment members 8 against the piece 5. The position of the clamping jaws 2 remains unchanged. It is clear that, at the end of this step, the piece 5 will be completely locked against radial displacements in any direction. This locking, while being positive, due to the wedging action of the element 3, does not exert on the piece 5 any appreciable radial stress, due to the force depreciation afforded by the slopes of the wedges and the cooperating oblique surfaces of the abutment members. Furthermore, this action is not exerted by fluid pressure but only by the springs 9, so that the force can be reduced as much as desired.

During the last step of the operation, the sliding valve 24 is brought from the position shown in Figure 10 to that of Figure 11. The pipe 18 remains connected with the tank 30 but the pipe 15 is now set into communication with the pump 16, its previous connection with the tank 30 being meanwhile interrupted.

Under these conditions, while the abutment members 8 remain in position against the piece 5, the cylinders 7 are put under pressure and the clamping jaws 2 are brought into contact with the piece 5 and firmly clamp the same to make it rotationally fast with the chuck 1.

It will be noted that the simultaneous communication of the cylinders 7 with the pump 16 ensures a balancing effect between the clamping jaws 2 in the same manner as the floating control described with reference to Figures 1 to 5.

Figure 8:
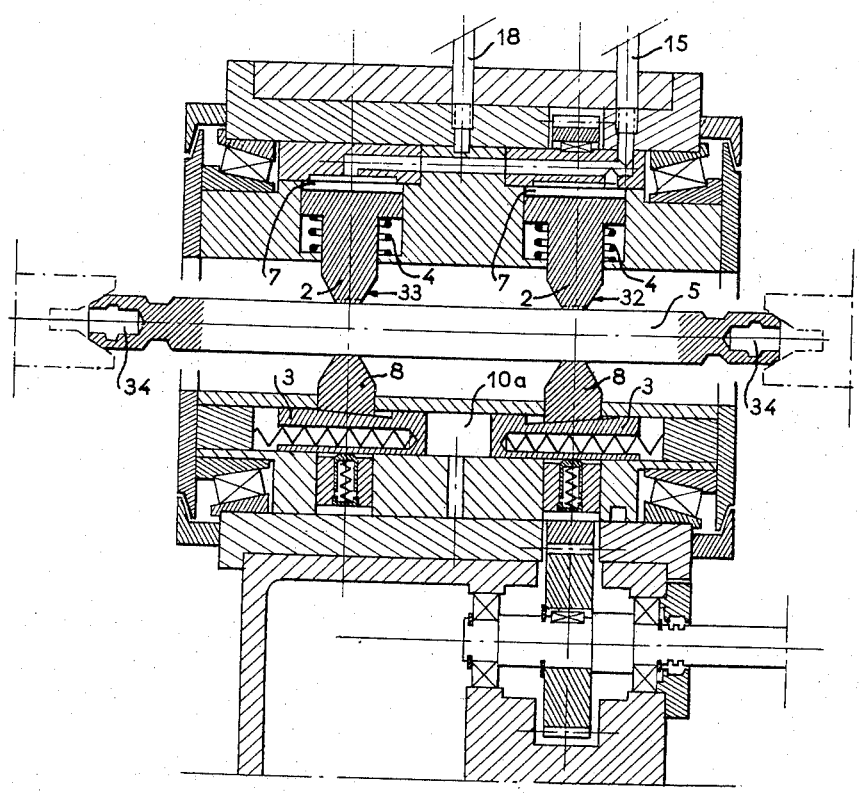
Fig. 8 shows a double-chuck of the type shown in Figs. 6 and 7.

The double chuck shown in Figure 8 comprises two sets of abutment members and clamping jaws, generally designated at 32, 33, axially spaced to permit holding the work piece 5 in two separate radial planes.

In this embodiment, all cylinders 7 of both sets continuously communicate with the pipe 15, so that a balancing effect is obtained not only between the three clamping jaws 4 of each set, but also between both sets of clamping jaws. Similarly, the cylinders 10 provided for actuating the wedges 3 are grouped pairwise, as shown at 10a and the three compartments 10a communicate with the pipe 18 of the chuck assembly.

It will be noted that this double chuck construction permits dismounting the work piece 5 from its centers, once it is safely clamped by both sets of clamping jaws. This makes it possible to machine the ends of the work piece as shown at 34.

In a general manner, while, in the above description, is disclosed what is deemed to be practical and efficient embodiment of the invention, it should be well understood that the invention is not to be limited thereto as there might be changes made in the arrangement, disposition and form of the parts without departing from the principle of the present invention.

What is claimed is:

1. A rotary chuck comprising, in combination, a body having an axial bore adapted to receive a piece of work, at least three adjustable abutment members mounted on said body for displacement towards and away from the axis of said bore, means to bring said abutment members into contact under slight radial pressure with a work piece passing through said bore at peripheral points of said piece, located in a common cross-section plane and angularly spaced by less than 180 degrees, means to prevent said piece from moving said abutment members, clutching means to temporarily make said chuck body rotatively fast with said work piece without at any time exerting on the latter any appreciable unidirectional radial stress, and means to prevent operation of said clutching means until all of said abutment members have been put into active position.

2. A rotary chuck comprising, in combination, a body having an axial bore adapted to receive a piece of work, at least three radially adjustable abutment members mounted on said body and angularly spaced by less than 180 degrees, a wedging member operatively associated with each one of said abutment members to bring the same into contact with a work piece passing through said bore, and to prevent said piece from moving said abutment member, resilient means to actuate said wedging member, releasing means to withdraw said wedging member against the action of said resilient means, clutching means to temporarily make said chuck rotatively fast with said work piece without at any time exerting on the latter any appreciable unidirectional radial stress, and means to prevent operation of said clutching means until all of said abutment members have been put into active position by said wedging members.

3. A rotary chuck according to claim 2, wherein said releasing means is constituted by a hydraulic system and wherein said clutching means can be actuated only when said hydraulic system is inoperative.

4. A rotary chuck comprising, in combination, a body having an axial bore adapted to receive a piece of work, at least three dogs pivoted on said body in axial planes thereof, angularly spaced by less than 180 degrees, each one of said dogs being provided with a cam-shaped edge adapted to come into wedging contact with a work piece passing through said bore, resilient means to operate said dogs, releasing means to unwedge said dogs against the action of said resilient means, clutching means to temporarily make said chuck body rotatively fast with said work piece without at any time exerting on the latter any appreciable unidirectional radial stresses and means to prevent operation of said clutching means until all of said dogs have been put into active position.

5. A rotary chuck according to claim 1, wherein said clutching means are constituted by at least three radially adjustable clamping jaws, means being provided to clamp said jaws on a work piece passing through said chuck with a uniform distribution of the clamping stresses among said jaws.

6. A rotary chuck according to claim 5, wherein said last-mentioned means includes a floating mechanical link.

7. A rotary chuck according to claim 5, comprising a source of pressure fluid wherein said last-mentioned means is constituted by a hydraulic system including a single acting jack associated with each one of said clamping jaws and means to simultaneously feed said jacks with pressure fluid from said source.

8. A rotary chuck comprising, in combination, a body having an axial bore adapted to receive a piece of work, at least three adjustable dogs pivoted on said body for displacement in axial planes thereof angularly spaced by less than 180°, resilient means to bring said dogs into contact, under slight radial pressure, with a work piece passing through said bore, at least three radially adjustable clamping jaws slidably mounted on said body, and a mechanism to successively actuate said dogs and bring said clamping jaws into frictional driving contact with said piece without at any time exerting on the latter any appreciable unidirectional axial stress.

9. A rotary chuck comprising, in combination, a body having an axial bore adapted to receive a piece of work, at least three adjustable abutment members slidably mounted on said body for displacement in radial planes thereof angularly spaced by less than 180 degrees, wedging members associated with said abutment members to wedge the same against a work piece passing through said bore, resilient means to actuate said wedging members so as to hold said abutment members in contact, under slight radial pressure, with said work piece, a hydraulic jack to release each one of said wedging members against the action of said resilient means, at least three clamping jaws radially slidable on said body, a hydraulic jack associated with each one of said clamping jaws to bring the same into frictional driving contact with said piece, a source of pressure fluid, a tank for said fluid, and distributing means to selectively communicate said wedging member hydraulic jacks and said clamping jaw hydraulic jacks with said tank and said source to thereby selectively hold said clamping jaws and wedging members inoperative and successively bring first said abutment members and then said clamping jaws into contact with said work piece.

10. A double chuck comprising two sets of abutment members and clamping jaws according to claim 9, said distributing means being adapted to simultaneously communicate said source and said tank selectively with all abutment member hydraulic jacks of both sets on the one hand and all clamping jaw hydraulic jacks of both sets on the other hand.

References Cited in the file of this patent

UNITED STATES PATENTS

| | | |
|---|---|---|
| 966,630 | Whiton | Aug. 9, 1910 |
| 1,812,006 | Jellicoe | June 30, 1931 |
| 2,323,091 | Johnston et al. | June 29, 1943 |
| 2,703,242 | Sloan et al. | Mar. 1, 1955 |